US012609546B2

(12) United States Patent
Downs et al.

(10) Patent No.: US 12,609,546 B2
(45) Date of Patent: Apr. 21, 2026

(54) APPARATUS AND METHODS FOR CHARGING A DEVICE IN A PLURALITY OF POSITIONS

(71) Applicant: Shure Acquisition Holdings, Inc., Niles, IL (US)

(72) Inventors: Tom J. Downs, La Grange, IL (US); Wade K. Fournier, Spring Grove, IL (US); Jase A. Ruggles, Chicago, IL (US)

(73) Assignee: Shure Acquisition Holdings, Inc., Niles, IL (US)

( * ) Notice: Subject to any disclaimer, the term of this patent is extended or adjusted under 35 U.S.C. 154(b) by 758 days.

(21) Appl. No.: 18/051,306

(22) Filed: Oct. 31, 2022

(65) Prior Publication Data

US 2023/0146913 A1    May 11, 2023

Related U.S. Application Data

(60) Provisional application No. 63/277,743, filed on Nov. 10, 2021.

(51) Int. Cl.
*H01M 10/46* (2006.01)
*H02J 7/00* (2006.01)
*H04B 1/3883* (2015.01)

(52) U.S. Cl.
CPC .......... *H02J 7/0045* (2013.01); *H02J 7/0013* (2013.01); *H04B 1/3883* (2013.01)

(58) Field of Classification Search
CPC ...... H02J 7/0045; H02J 7/0013; H02J 7/0042; H02J 2310/22; H04B 1/3883
USPC .......................... 320/107, 114, 115, 116, 138
See application file for complete search history.

(56) References Cited

U.S. PATENT DOCUMENTS

| | | | |
|---|---|---|---|
| D402,258 S | 12/1998 | Kawakami | |
| 6,124,699 A * | 9/2000 | Suzuki ................... | H02J 7/0045 |
| | | | 429/100 |
| 6,765,366 B2 | 7/2004 | Maggert et al. | |
| 7,923,964 B2 | 4/2011 | Lin et al. | |
| 8,230,992 B2 * | 7/2012 | Law ...................... | G06F 1/1632 |
| | | | 248/176.1 |
| 8,604,753 B2 | 12/2013 | Bessa et al. | |
| 8,619,416 B2 | 12/2013 | Lim | |

(Continued)

FOREIGN PATENT DOCUMENTS

| | | |
|---|---|---|
| CN | 207233810 U | 4/2018 |
| DE | 402013100568-0005 | 3/2014 |

(Continued)

OTHER PUBLICATIONS

Shure USA, "SBC200 Dual Docking Recharging Station," visited at https://www.shure.com/en-US/products/accessories/sbc200?variant= SBC200 on Oct. 31, 2022.

*Primary Examiner* — Edward Tso
(74) *Attorney, Agent, or Firm* — Banner & Witcoff, Ltd.

(57) ABSTRACT

A charging apparatus including a device holder disposed within a cavity, wherein the device holder is pivotably attached to a base and is configured to receive a first device type and continuously charge the first device as the device holder rotates from a first position to a second position and throughout rotation from the first position to the second position. The charging apparatus may include a charging element disposed within the cavity that is configured to receive and charge a second device type.

20 Claims, 9 Drawing Sheets

(56) References Cited

U.S. PATENT DOCUMENTS

| | | | |
|---|---|---|---|
| D743,966 S | 11/2015 | Izen et al. | |
| D749,042 S | 2/2016 | Gecawicz et al. | |
| 9,276,423 B2 | 3/2016 | Yang | |
| 2012/0062179 A1* | 3/2012 | Kuo ........................ | G06F 1/266 |
| | | | 320/115 |
| 2013/0088193 A1* | 4/2013 | Chen .................... | H02J 7/0044 |
| | | | 320/108 |
| 2019/0148899 A1 | 5/2019 | Badie et al. | |

FOREIGN PATENT DOCUMENTS

| | | | |
|---|---|---|---|
| EP | 0620135 A3 | 4/1995 | |
| KR | 300746394.0000 | 6/2014 | |

* cited by examiner

APPARATUS AND METHODS FOR CHARGING A DEVICE IN A PLURALITY OF POSITIONS

CROSS REFERENCE TO RELATED APPLICATION

This application claims priority to U.S. Provisional Patent Application No. 63/277,743, filed on Nov. 10, 2021, which is hereby incorporated by reference in its entirety.

FIELD

The present disclosure generally relates to a charger, and more particularly to a charger that is pivotably attached to a base and configured to continuously charge a number of device types.

BACKGROUND

Wireless transceivers, transmitters, and wireless microphones (collectively, "wireless devices") generally feature batteries that must be occasionally charged. The batteries of the wireless devices may be removable. In certain instances, these wireless devices or their batteries may be charged in one housing and transported or stored in another housing. Further, in some instances, a charging housing may be configured to charge wireless devices in upright orientations.

SUMMARY

The following presents a simplified summary of the disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

In one aspect, an example charging apparatus may include a device holder that is configured to continuously supply a charging current to a wireless device and a battery holder that is configured to continuously supply a charging current to a battery. The device holder may continuously supply a charging current to a wireless device while the device holder is in a plurality of positions, which may afford the charging apparatus a lower overall profile and may enhance the storability of the charging apparatus while the charging apparatus charges at least one device and/or device battery. In one example, the charging apparatus may simultaneously charge a wireless device and a battery of the same type of wireless device. Other aspects of the disclosure herein may relate to methods of charging a wireless device and a wireless device battery.

These as well as other novel advantages, details, embodiments, features and objects of the present disclosure will be apparent to those skilled in the art from the following detailed description of the disclosure, the attached claims and accompanying drawings, listed herein, which are useful in explaining the disclosure.

BRIEF DESCRIPTION OF THE DRAWINGS

A more complete understanding of the present disclosure and the advantages thereof may be acquired by referring to the following description in consideration of the accompanying drawings, in which like reference numbers indicate like features, and wherein.

DETAILED DESCRIPTION

In the following description of the various examples, reference is made to the accompanying drawings, which form a part hereof, and in which is shown by way of illustration various examples in which aspects may be practiced. References to "embodiment," "example," and the like indicate that the embodiment(s) or example(s) of the disclosure so described may include particular features, structures, or characteristics, but not every embodiment or example necessarily includes the particular features, structures, or characteristics. Further, it is contemplated that certain embodiments or examples may have some, all, or none of the features described for other examples. And it is to be understood that other embodiments and examples may be utilized and structural and functional modifications may be made without departing from the scope of the present disclosure.

Unless otherwise specified, the use of the serial adjectives, such as, "first," "second," "third," and the like that are used to describe components, are used only to indicate different components, which can be similar components. But the use of such serial adjectives are not intended to imply that the components must be provided in given order, either temporally, spatially, in ranking, or in any other way.

Also, while the terms "front," "back," "side," and the like may be used in this specification to describe various example features and elements, these terms are used herein as a matter of convenience, for example, based on the example orientations shown in the figures and/or the orientations in typical use. Nothing in this specification should be construed as requiring a specific three dimensional or spatial orientation of structures in order to fall within the scope of the claims.

Figure 1:
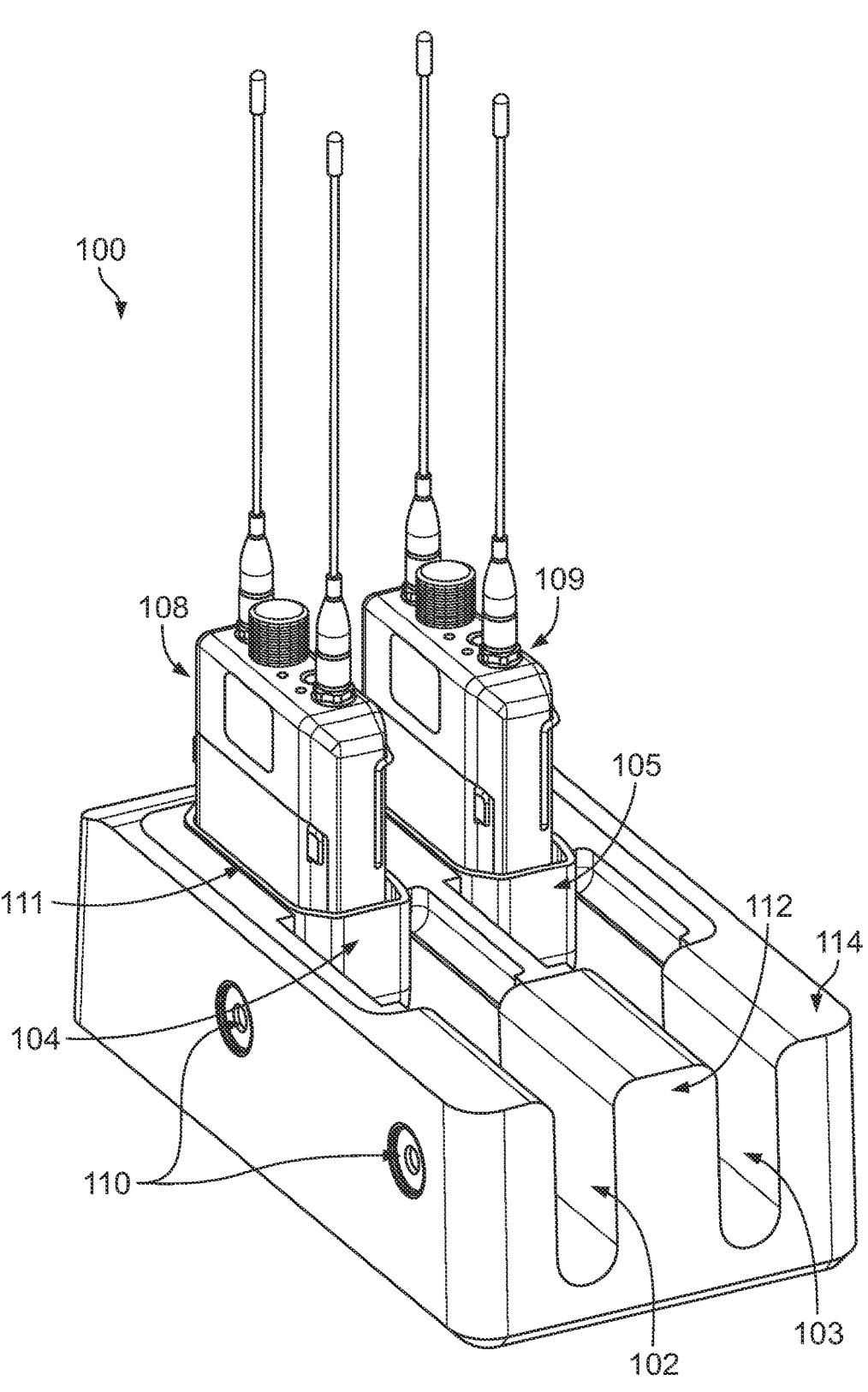
FIG. 1 is a perspective view of an example charging apparatus made in accordance with the present disclosure.

Referring to FIG. 1, the present disclosure includes, in one example, a charging base 100 that may be configured to charge wireless transceivers, wireless transmitters, and wireless microphones (collectively, "devices") and batteries of the devices, or a combination thereof. The base 100 may include an input terminal for receiving external power and an ethernet input terminal (not shown). The base 100 may include an internal printed circuit board (PCB) (not shown)

that may be electrically connected to the input terminal and may be configured as the motherboard of the base 100. In one example, the motherboard may include an AC/DC converter. In another example, the AC/DC converter may be external to the base 100. The motherboard may include a computing device. The base 100 may include a slot (or cavity) 102 and a slot (or cavity) 103 that each define a cavity along the length of the base. Alternatively, the base 100 may only include slot 102. The slots 102 and 103 may be configured such that the cavities defined by slots 102 and 103 extend through the forward face of the base 100. It is to be understood that slots 102 and 103 are substantially similar in all respects. Base 100 may include a front face 112 and top surface 114.

Device holders 104 and 105 may be disposed within slot 102 and 103, respectively. In some examples, device holders 104 and 105 may be configured to receive, maintain, and charge devices 108 and 109, respectively. Devices 108 and 109 may be a number of device types, including but not limited to a wireless transceiver, a wireless transmitter, or a wireless microphone. Device 109 may be the same device type as device 108 or a different device type. For simplicity, certain examples will be described with respect to device holder 104, device 108, and the relationship between device holder 104 and device 108, or with respect to device holder 105, device 109, and the relationship between device holder 105 and device 109. It is to be understood that device holders 104 and 105 are substantially similar in all respects and that device holders 104 and 105 may include all features discussed with respect to the other. Further, while device 109 may be a different device type than device 108, its relationship to device holder 105 may be substantially similar to that of device 108 with device holder 104.

The device holder 104 may be pivotably fixed to the base. The device holder 104 may be configured to allow a user to rotate the device holder 104 from a first position (i.e. an "open" position) to a second position (i.e. a "closed position) while continuously providing a charging current to device 108. In one example, the device holder 104 may be configured to pivot about an axis that is parallel to the length of the slot 102. In another example, the device holder 104 may be configured to pivot about an axis that is perpendicular to the length of slot 102. In one example, the device holder 104 can be configured to rotate 90°. But it is also contemplated that the device holder can be configured to rotate more or less than 90° to for example, 45° 180°, 270°, 360°, etc.

FIG. 1 depicts the device holder 104 in the open position. In this position, the receiving face (or engaging face) 111 of the device holder 104 (shown only with respect to device holder 104) may be at zero degrees relative to normal, may be substantially parallel with the top surface 114 of the base 100, and may be substantially flush with the top surface 114 of the base 100. When device holder 104 is in the open position, a user may place device 108 into the device holder 104 and into contact with the charging element.

Figure 2A:
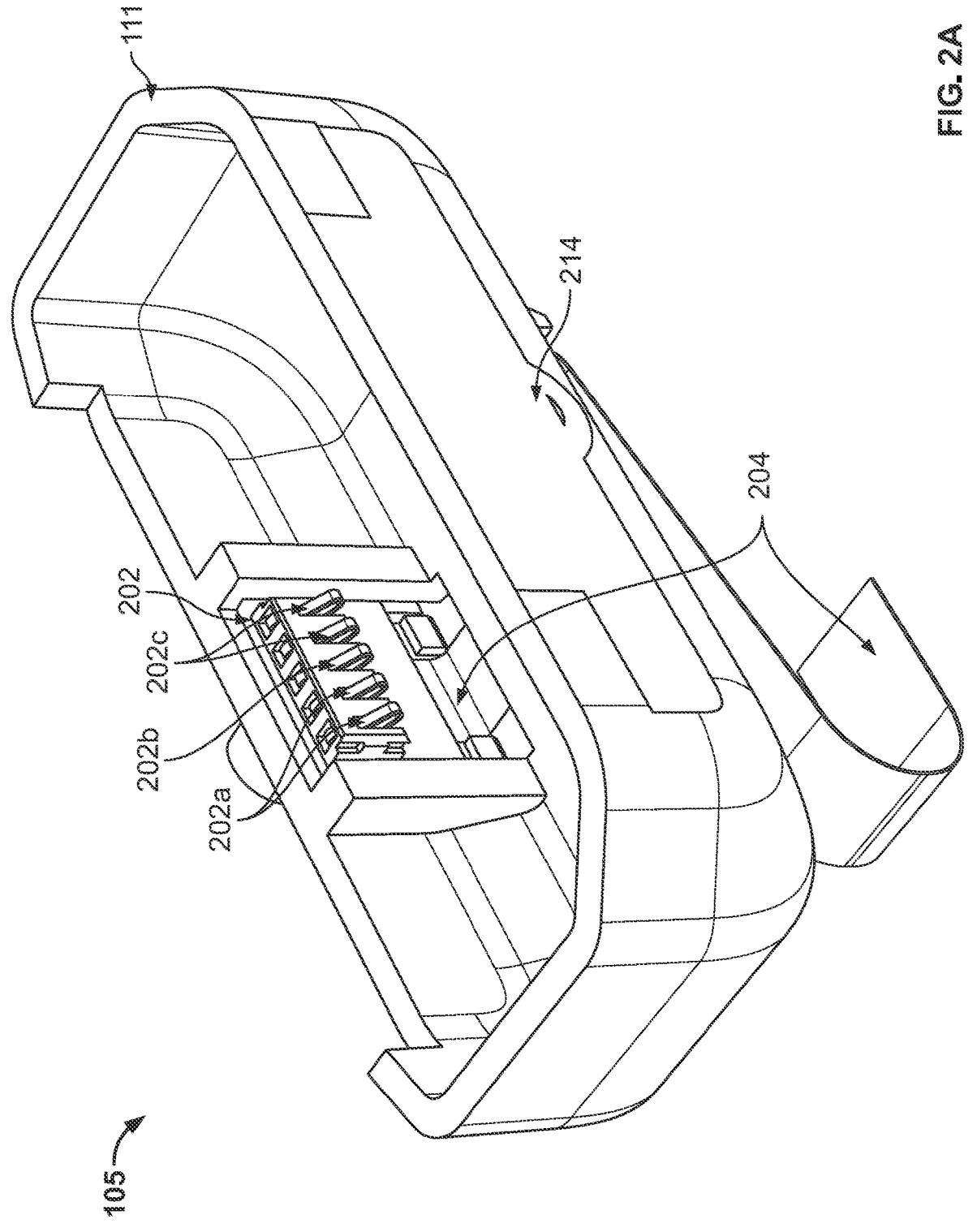
FIG. 2a is a perspective view of an example device holder isolated from the charging apparatus of FIG. 1.

FIG. 2a illustrates an example device holder 104 removed from the base 100. Device holder 104 may include a charging element that may include an electrical contact 202 attached to a sidewall of the device holder 104, configured to engage with a complementary charging input terminal on the device 108 (not shown), thus supplying a charging current to device 108. In one example, the electrical contact 202 may be magnetically coupled to a sidewall of device holder 104. The electrical contact 202 may be electrically connected to a PCB 206 (shown in FIG. 2c). The PCB 206 may be electrically connected to the motherboard (not shown) of base 100 via a flexible cable 204 such as a ribbon cable or flex strip. The cable 204 may be disposed underneath each device holder and may include sufficient slack to remain connected to each respective charging element as each device holder pivots from the open position to the closed position. In one example, the output terminals of the electrical contact 202 may be configured as a 5-pin arrangement wherein pins 202a may be allocated for supplying power to the device 108, pin 202b may register the internal battery temperature of device 108, and pins 202c may monitor the charging status and battery health of the device 108. The cable 204 may be electrically connected to the motherboard (not shown) of the base 100. In some examples, the base 100 may be configured to provide an internal power supply. In another example, the electrical contact 202 and device 108 may each be configured to enable inductive charging of device 108.

Figure 2B:
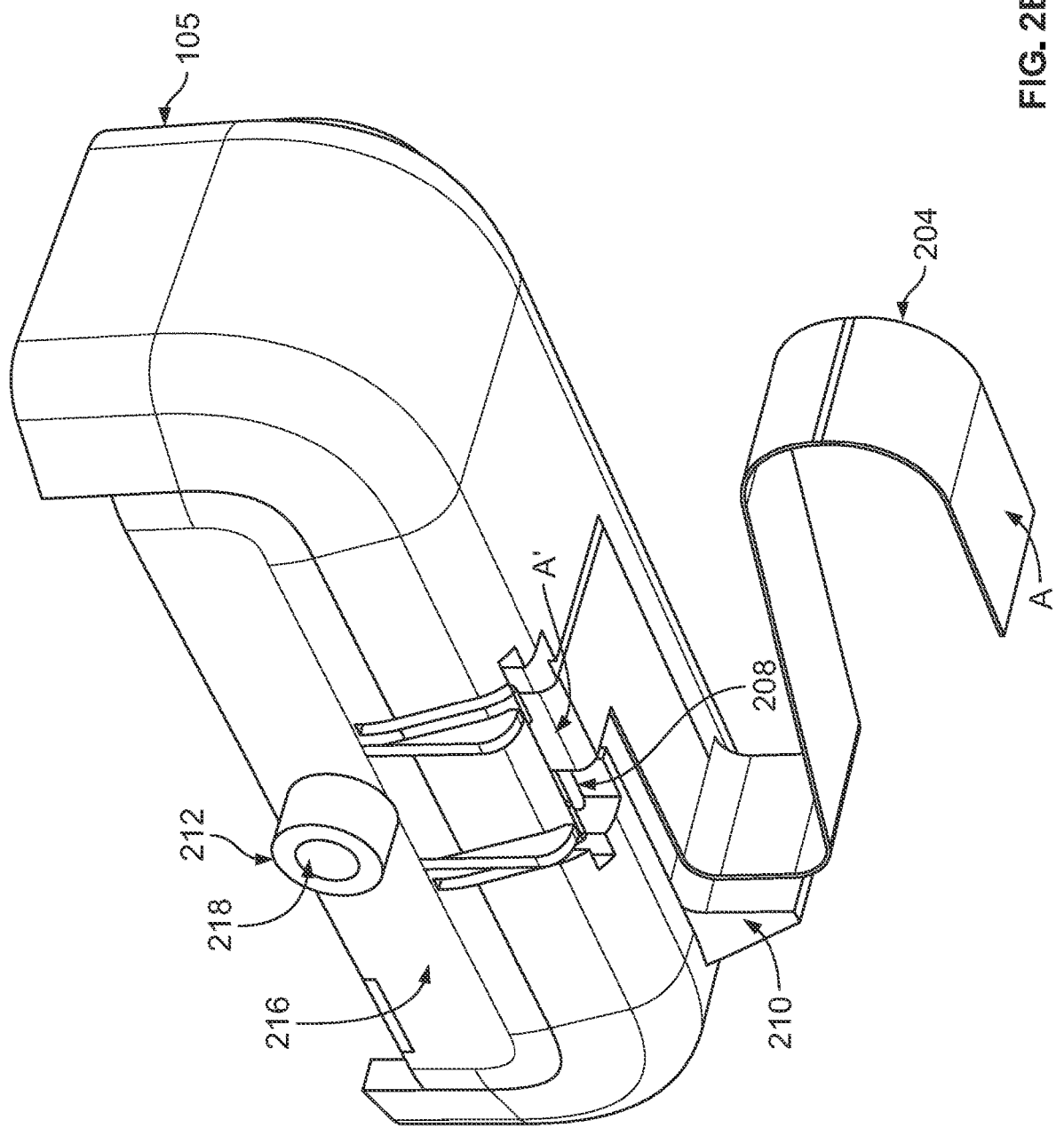
FIG. 2b is a perspective view of an example device holder isolated from the charging apparatus of FIG. 1.

FIG. 2b illustrates an example device holder 105 removed from the base 100, and further illustrates an example configuration of cable 204 coupled to the charging element of device holder 105. In some examples, a substantial majority of the length of cable 204 may be disposed underneath device holder 105 in a cavity between the bottom of device holder 105 and above the base 100. Cable 204 may be configured to rest in said cavity while remaining electrically coupled to the motherboard and PCB 206 (shown in FIG. 2c) while the device holder 105 rotates from an open to a closed position, and vice versa. For example, a substantial portion of cable 204 may be configured to rest in a serpentine manner in said cavity and may possess such slack as to allow device holder 105 to rotate from an open position to a closed position, and vice versa, while remaining electrically coupled to the motherboard and PCB 206 (shown in FIG. 2c). In some examples, end A of the cable 204 may be disposed within the base and connected to the motherboard. In some examples, the device holder 105 may include a protruding member 210. Member 210 may be integrally molded to the device holder 105 and may be configured in a variety of shapes. Member 210 may be configured to direct the cable 204 towards and along the bottom of device holder 105. For example, member 210 may engage with cable 204 and may cause the cable 204 to conform to the inner slope of member 210 such that the cable 204 is upwardly redirected towards the bottom of the device holder 105. A portion of the cable 204 proximal to end A' may run along the bottom of device holder 105. The portion of the cable 204 running along the bottom of device holder 105 may be adhesively fixed to the device holder. In some examples, device holder 105 may include an aperture 208 disposed on the bottom side of the device holder 105. The aperture 208 may be configured to allow end A' of the cable 204 to pass through aperture 208 and consequently electrically couple with the PCB 206 (shown in FIG. 2c).

In one example, device holder 105 may include a cylindrical appendage 212 that extends outwards from the device holder. The appendage 212 may be integrally molded to the sidewall 214 (as shown in FIG. 2a) or sidewall 216. The cylindrical appendages may be rotatably coupled or pivotably fixed to an axle (not shown) disposed in the corresponding interior sidewall of base 100 via aperture 218. In this example, a user may freely rotate the device holder 105 from the open position to the closed position, and vice versa.

Figure 2C:
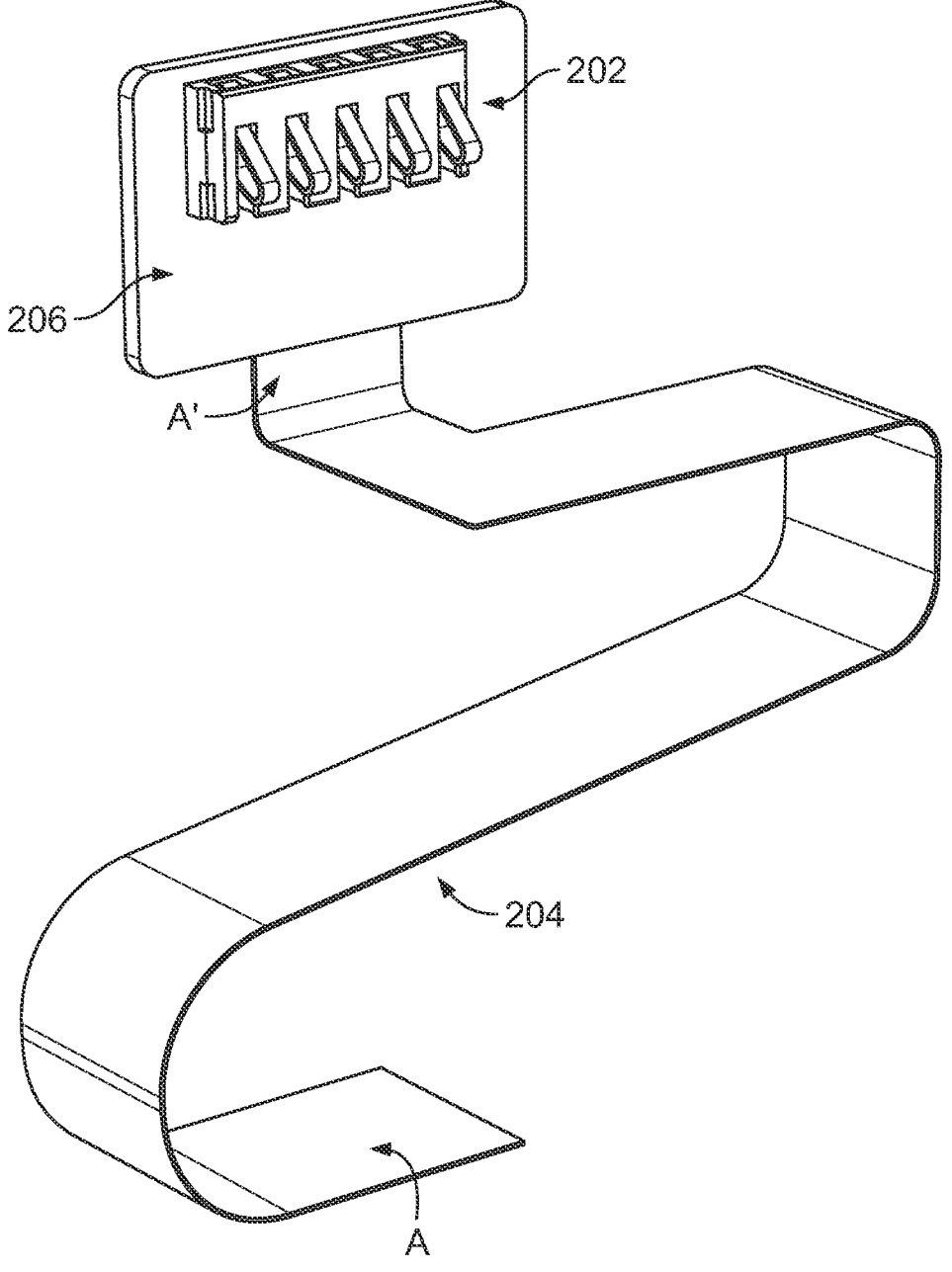
FIG. 2c is a perspective view of an example electrical contact and cable assembly isolated from the example device holder of FIGS. 2a and 2b.

FIG. 2c illustrates an example configuration of the electrical contact 202 and cable 204 assembly isolated from device holder 105. As mentioned, cable 204 may be electrically coupled to PCB 206 and may be configured to remain coupled to PCB 206 as the device holder rotates throughout open, closed, and intermediate positions. In one example, cable 204 may be soldered onto PCB 206. In another example, cable 204 may include an output port disposed on side A' of cable 204. Cable 204 may mechanically couple to a complementary input port on PCB 206.

Figure 3:
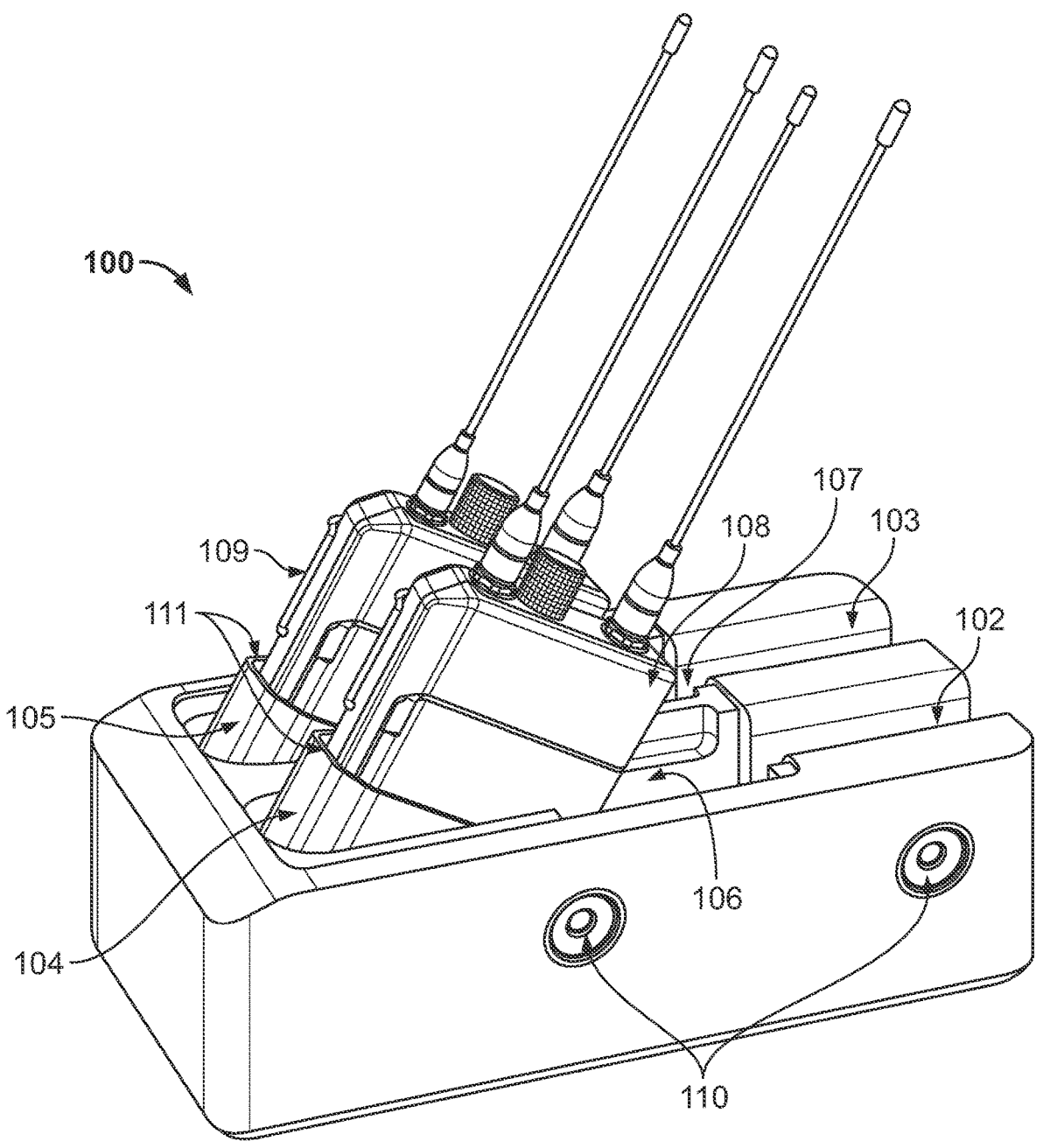
FIG. 3 is a perspective view of the charging apparatus of FIG. 1.
Figure 4:
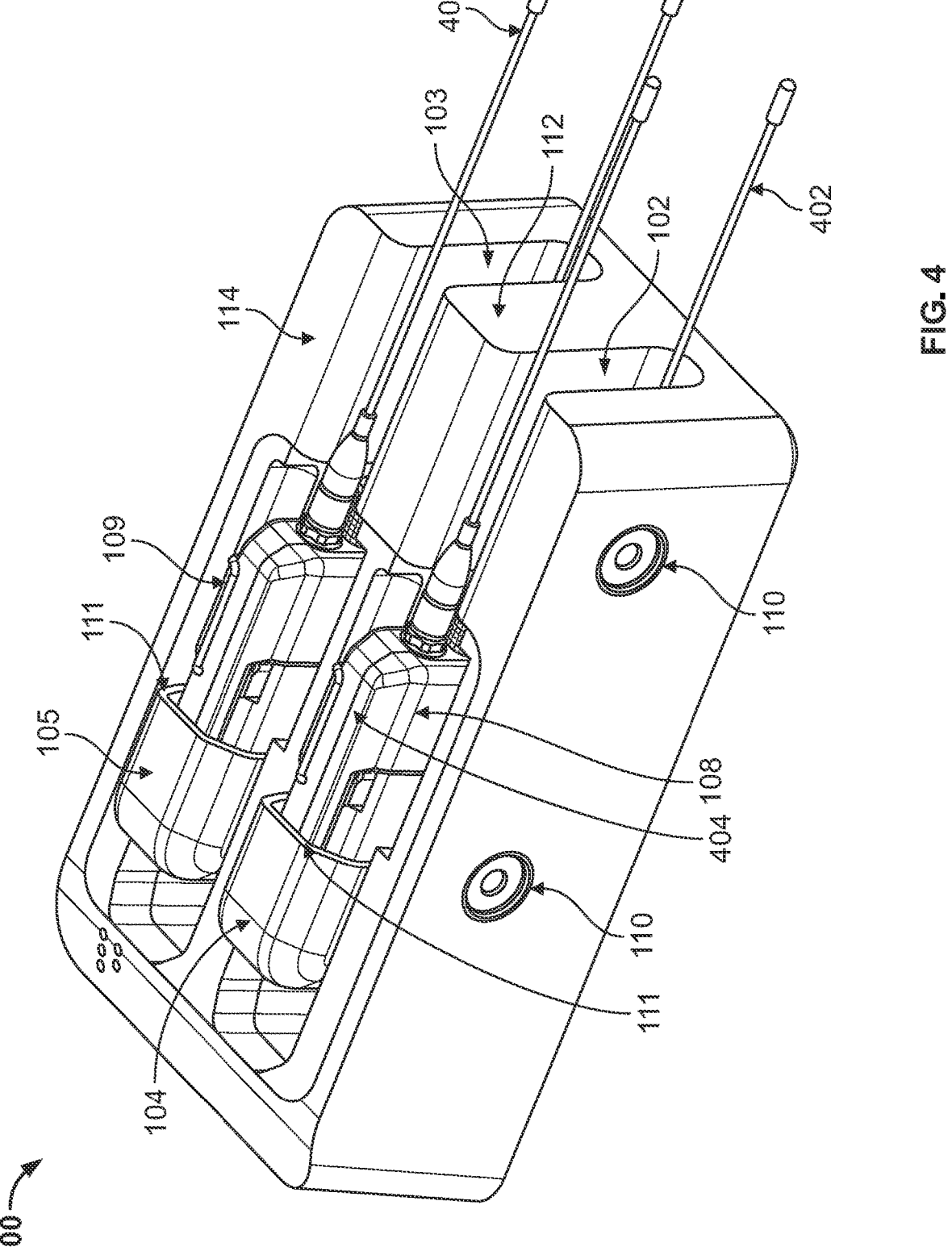
FIG. 4 is a perspective view of the charging apparatus of FIG. 1.

FIGS. 3 and 4 depict the device holder 104 positioned in an intermediate position and a closed position, respectively. In the intermediate position, the receiving face 111 of the device holder 104 may be between zero degrees and less than 90 degrees relative to normal. When the device holder 104 is in an intermediate position, a user may either place device 108 into the device holder 104 and the base 100 may begin charging the device(s) 108, or the user may remove the device 108 from one the device holders 104 to use the device 108. In the closed position, the receiving face 111 the device holder 104 may be 90 degrees relative to normal and may be substantially perpendicular to the top of the base 100. When device holders 104 and 105 are in the closed position, the devices 108 and 109 may exhibit a height that is lower than when holders 104 and 105 are in the open position, which may enable a user to securely store the base 100 in, for example, a three-rack unit cabinet (not shown) when the devices 108 and/or 109 are not in use, are being charged, or are being transported or stored.

Referring again to FIG. 3, the device holder 104 may be configured such that it may remain in various incremental positions throughout rotation from the first position to the second position. In one example, this may be accomplished with a ratchet hinge assembly. As mentioned with respect to FIG. 2*b*, the device holder 104 may include a molded appendage 212 on a sidewall of device holder 104 that extends outwards from the device holder. The appendage 212 may include integrally molded teeth that may be evenly spaced in a radial arrangement about the appendage 212. A ball plunger may be disposed within the corresponding sidewall of base 100. The ball plunger may be configured as a standard ball plunger, a press-fit ball plunger, or a self-retaining ball plunger. In one example, the ball plunger may be configured as a spring-loaded plunger. During operation, the teeth of appendage 212 may slide over the ball plunger as the device holder is rotated to a desired position, whereupon the ball plunger engages with a gap between given teeth and the hinge locks. Pressure on the device holder may force the ball plunger out of engagement with the ratchet assembly and the device holder 104 may be further rotated to another desired position. In another example, appendage 212 may include an integrally molded disk that constantly engages with the ball plunger. In this example, the ball plunger may provide a continual a biasing force on the device holder 104 such that it may remain in various incremental positions throughout rotation from the first position to the second position. Alternatively, an elastic member composed of a resilient material may be disposed along the sidewall of base 100 and may engage with appendage 212 and provide a biasing force against appendage 212 as device holder 104 is rotated from an open position, through several intermediate positions, to a closed position, and vice versa. Additionally, as mentioned, when the device holders 104 and/or 105 are rotated from the open position to the closed position (and vice versa), and throughout rotation from the first position to the second position (i.e. to various incremental or intermediate positions), the respective electrical contacts may be configured to maintain contact with devices 108 and 109 and to supply a continuous charging current to the devices 108 and 109.

In one example, device holder 104 may be configured to rotate independently of device holder 105. In some examples, a user may wish to charge device 108 in slot 102 while charging a battery 510 in slot 103. In another example, a user may wish to charge device 109 in slot 103 while charging a battery 510 in slot 102. Thus, a user may rotate device holder 104 to the closed position while leaving the device holder 105 in the open position. This configuration may allow a user to charge a battery 510 in battery holder 106 while allowing the user to charge device 109 in the device holder 105, and vice versa. In another example, the device holders 104 and 105 may be configured to rotate in unison, such that rotation of each device holder causes the equivalent rotation of the other device holder. In this configuration, a user may either charge devices 108 and 109 in device holders 104 and 105, respectively, or two batteries 510 at a given time in battery holders 106 and 107.

In one example, the base 100 may include connection terminals 110 that may enable several bases to be mechanically and electrically coupled together. The connection terminals 110 may include a central power pass-through terminal that may supply the additional bases with power. Up to four bases may share one power supply. The bases may be connected by aligning the corresponding terminals 110 and inserting set screws to fasten the bases together. The terminals 110 may also include an outer contact ring that may be configured to collect information among the bases including, but not limited to, the device types being charged in each respective base, the charging status of each device, the battery health of each device, and the like. The base 100 may relay said information to an external processor via an ethernet connection.

Referring to FIG. 4, the charging element on the device holder 104 may be configured to provide a continuous charging current to device 108 when the device holder 104 is in the closed position. When the device holder 104 is in the closed position, the device 108 may exhibit a height that is lower than when holder 104 is in the open position, which may enable a user to securely store the base 100 in, for example, a three-rack unit cabinet when the device 108 is not in use. The device 108 may include a plurality of antennas 402 that extend past the forward wall of the base 100. The slot 102 may be configured such that the cavity it defines extends through the forward face of the base 100. In this way, a device 108 with antenna 402 may be charged while the device holder 104 is in the closed position without requiring a user to remove the antennas 402 from the device 108. Alternatively, the slot 102 may be configured such that the cavity it defines does not extend through the forward wall of the base 100.

In one example, device 108 may engage with slot 102 horizontally along the length of base 100. In this example, the base 100 may or may not include rotating device holder 104. Slot 102 may include a charging element (not shown), such as an electrical contact, substantially similar to charging element 202 (as shown in FIG. 2*a*) disposed in the sidewall of slot 102 and configured to engage with the charging input port (not shown) of device 108. The slot 102 may be configured such that the cavity it defines provides clearance for the antenna 402 to extend along the length of base 100 while device 108 is docked in slot 102. In this way, a device 108 with antenna 402 may be charged while the device 108 is horizontally docked in base 100 without requiring a user to remove the antennas 402 from the device 108. In one example, the length of the base 100 and slot 102 may correspond to the total length of the device 108 and antennas 402. In another example, the front face 112 of base 100 may include an opening 102 to allow antennas 402 to extend past the front face 112 of base 100. Slot 102 may be further configured to help reduce the vertical footprint of the device 108 when docked in base 100. For example, slot 102 may be configured with a depth such that the side 404 of device 108 may be substantially flush with the top surface 114 of the base when device 108 is horizontally docked in base 100.

Figure 5:
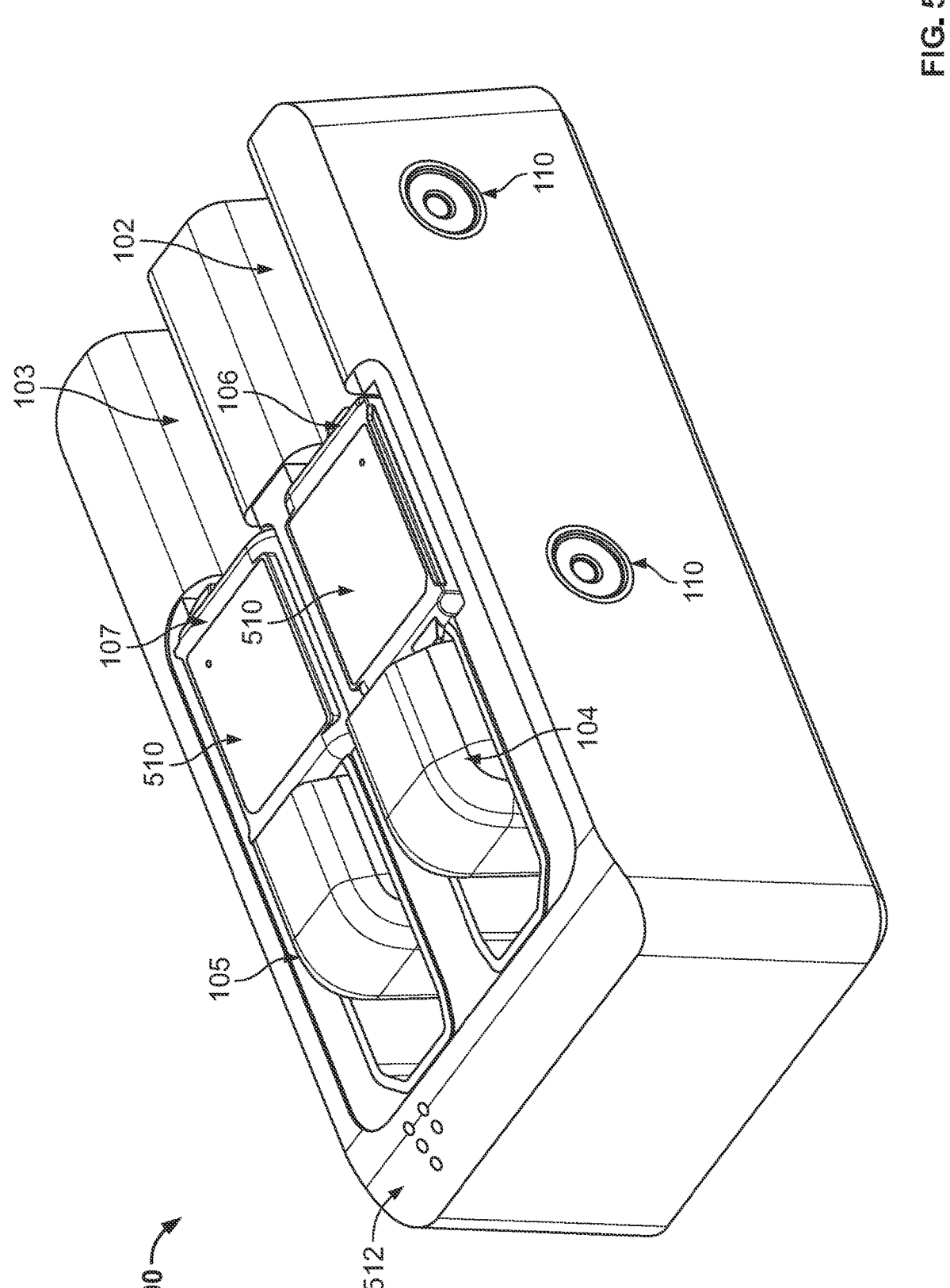
FIG. 5 is a perspective view of the charging apparatus of FIG. 1.

FIG. 5 depicts device holders 104 and 105 in the closed position without a device 108 and 109, respectively, maintained therein. Battery holders 106 and 107 may be disposed within slot 102 and 103, respectively, forwardly adjacent to the device holders 104 and 105. In some examples, the battery holders 106 and 107 may be configured to receive, maintain, and charge a battery 510. The battery 510 may be a battery of the same device type as that of device 108 and/or 109. In another example, the battery 510 may be a battery of a different device type than that of device 108 and/or 109.

Figure 6:
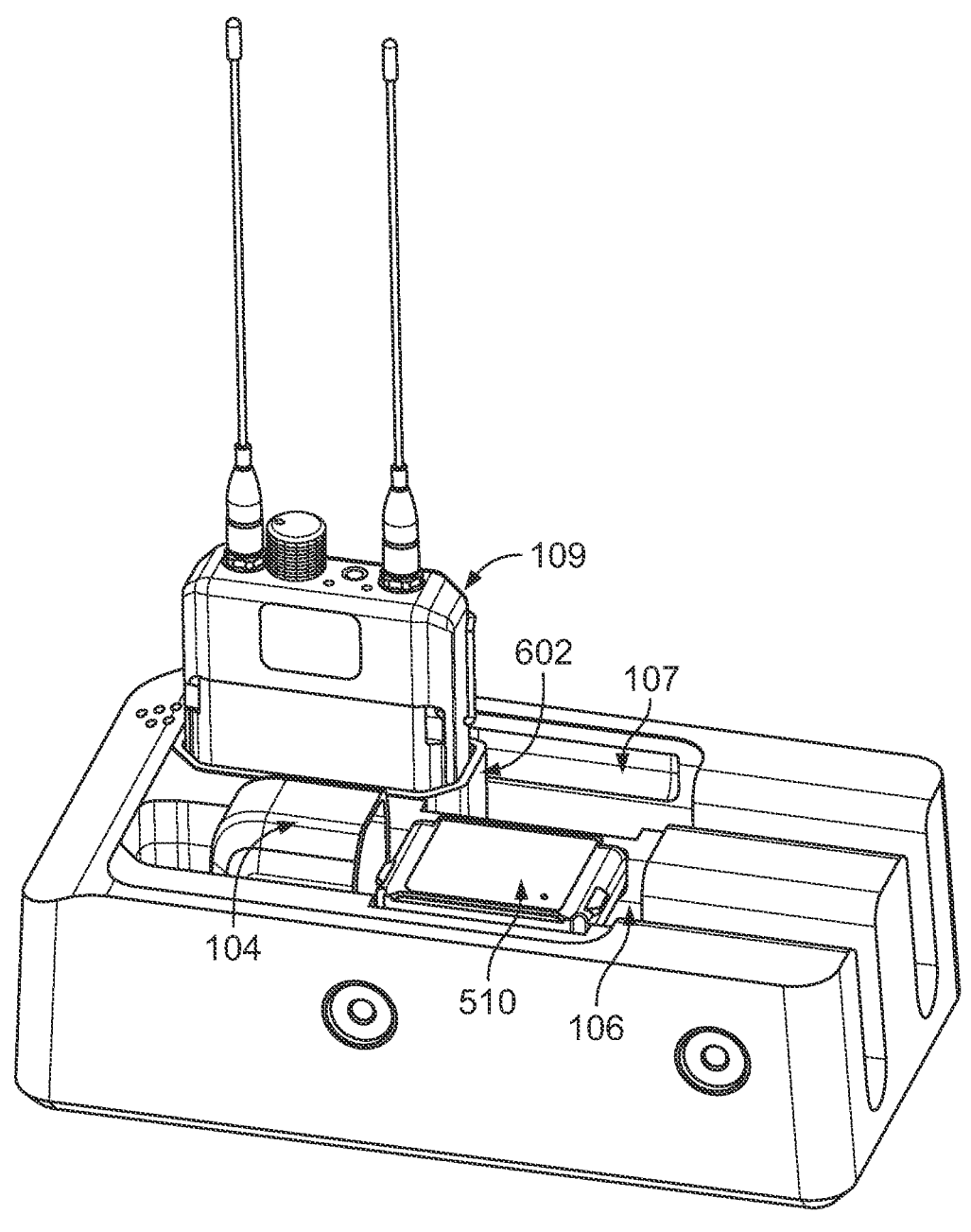
FIG. 6 is a perspective view of the charging apparatus of FIG. 1.

In one example, the device holders 104 and/or 105 may be configured such that only a device 108 and/or 109 or only a battery 510 may be charged in slot 102 and/or 103 at a given time. This may ensure that the base 100 can adequately supply power to either the device 108 and/or 109 or batteries 510 without degrading either. This may also prevent current overload due to simultaneous charging of a device 108 and battery 510 in slot 102, or simultaneous charging of device 109 and battery 510 in slot 103, for example. As shown in FIG. 6, the device holder 104 and/or device holder 105 may be configured such that the length of the device holders 104 and/or 105 mechanically prevents a user from inserting a battery into contact with the battery holders 106 and/or 107 when the device holders 104 and/or 105 are in the open position. In one example, a forward edge 602 of the receiving face 111 of the device holder 105 may extend into the cavity defined by the battery holder 107, preventing mechanical and electrical coupling of the battery 510 to the battery holder 107. As FIG. 6 further illustrates, when a user positions the device holder 104 in the closed position, battery 510 may be inserted into battery holder 106, consequently allowing battery 510 to come into contact with the electrical contact 516 (shown in FIG. 7b) of the battery holder 106.

In some examples, the base 100 may include an indicator 512 that displays information to a user regarding the charging status of devices 108 and 109 and/or a battery 510. The indicator 512 may be electrically connected to the motherboard of base 100. For example, the indicator 512 may be a plurality of LED lights. The LED lights may be arranged in rows to correspond with the matrix of device holders 104 and 105 and battery holders 106 and 107. The indicator 512 may display an array of signals indicative of charging status, battery health, and the like. For example, a red LED light may indicate that the devices 108 and/or 109 or battery 510 is charging. A yellow LED light may indicate that the device 108 and/or 109 or battery 510 cannot be charged and may need to undergo maintenance. A green LED light may indicate that the device 108 and/or 109 or battery 510 has fully charged and is ready for use.

Figure 7A:
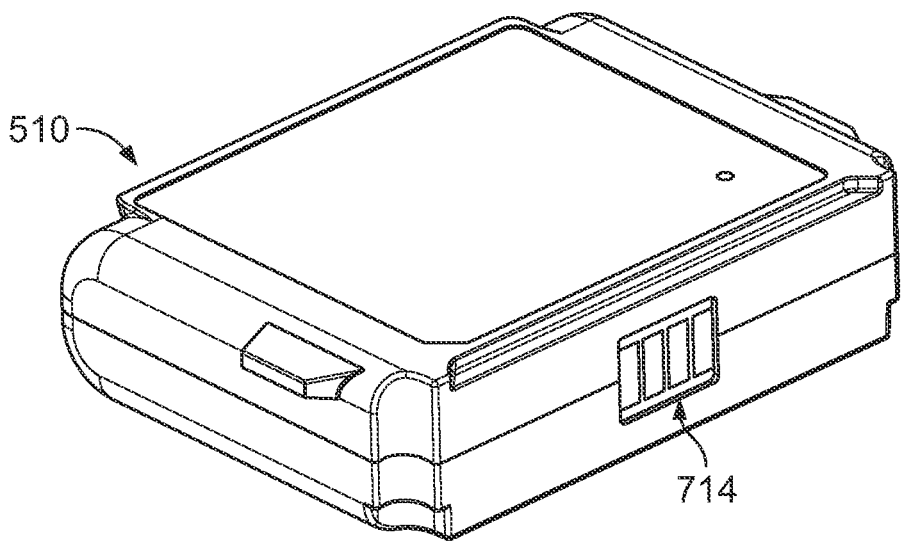
FIG. 7a is a perspective view of an example battery that may be used with the charging apparatus of FIG. 1.
Figure 7B:
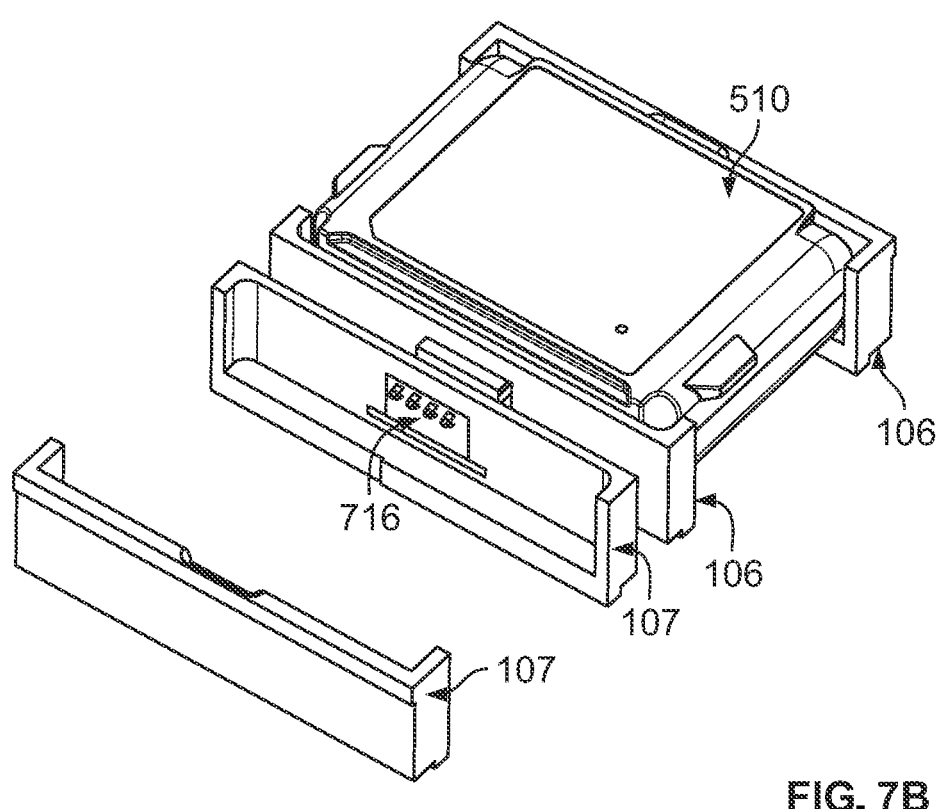
FIG. 7b is a perspective view of example battery holders isolated from the charging apparatus of FIG. 1.

Referring to FIG. 7a, battery 510 may include a charging input terminal 714. The input terminal 714 may be disposed on the side of battery 510. FIG. 7b illustrates example battery holders 106 and 107 isolated from slots 102 and 103, respectively. In one example, the battery holders 106 and 107 may each include an electrical contact 716 that may be attached to an upper portion of the sidewall of the battery holders 106 and 107. The electrical contact 716 may be electrically connected to the motherboard of base 100. The electrical contact 716 may be configured to engage with the complementary charging input terminal 714 of battery 510, thus supplying a charging current to battery 510. The battery holders 106 and 107 may be configured such that the battery 510 rests substantially flush to the top surface 114 of the base 100 while the battery 510 is maintained in the battery holders 106 and/or 107.

A charging apparatus may comprise a base. The base may comprise at least one cavity. At least one device holder may be disposed within the at least one cavity and may be pivotably fixed to the base. The at least one device holder may be configured to receive, maintain, and charge a first device type when the device holder is in a plurality of positions. The at least one device holder may further comprise an engaging face and a first electrical contact disposed within the at least one device holder configured to provide a charging current to the first device type. The engaging face may be parallel to the upper surface of the base and substantially flush with the upper surface of the base in a first position and the engaging face may be perpendicular to the upper surface of the base in a second position. The at least one cavity may further comprise at least one cavity electrical contact adjacent to the at least one device holder and is configured to engage and charge a second device type. The at least one device holder may comprise a width that precludes the at least one cavity electrical contact from engaging and charging the second device type when the at least one device holder is in the first position. The base may further comprise a first side and a second side, the first and second sides each comprising a plurality of connection terminals for mechanical and communicative attachment to a plurality of bases. The base may comprise a second cavity adjacent and parallel to the at least one cavity. The second cavity may comprise a second device holder disposed within the second cavity, which may be pivotably fixed to the base, independently pivotable from the at least one charging element, and configured to receive, maintain, and charge the first device type when the device holder is in a plurality of positions. The at least one device holder may further comprise an engaging face and a second electrical contact that may be disposed within the at least one device holder configured to provide a charging current to the first device type and a second cavity electrical contact that may be adjacent to the second device holder and may be configured to receive and charge the second device type. The at least one device holder may comprise a height when in the second position that is compatible with use in a 3-rack unit drawer. The first device type may be a transceiver and the second device type may be a battery for the transceiver.

A charging apparatus may comprise a first device holder configured to receive a first device type and a first electrical contact configured for providing a charging current to the first device type. The first device holder may be configured to rotate from a first position to a second position within a first slot of the charging apparatus while holding the first device type. The first electrical contact may be configured to maintain contact with the first device type in the first position, the second position, and throughout rotation from the first position to the second position such that the first electrical contact continuously provides current to the first device type so as to charge a battery of the first device type. The first device type may be configured to extend to a first height in the first position and in the second position the first device type may extend to a second height that is lower than the first height. The first cavity may further comprise a first cavity electrical contact configured to provide a charging current to a second device type. The first device holder, when in the second position, may allow the second device type to be inserted into contact with the first cavity electrical contact. The first device holder, when in the first position, may prevent the second device type to be inserted into contact with the first cavity electrical contact. The charging apparatus may further comprise a second device holder, configured to receive the first device type, and a second electrical contact configured for providing current to the first device type. The second electrical contact may be disposed within the second device holder. The second device holder may be configured to rotate from a first position to a second position within a second cavity. The second electrical contact may be configured to maintain contact with the first device type in the first position, the second position, and throughout rotation from the first position to the second position such that the second electrical contact may continuously provide current to the first device type. The first device type, in the first position, may be configured to extend to the first height and in the second position the first device type may extend to the second height that is lower than the first height. The second cavity may further comprise a second cavity electrical contact configured to provide a charging current to the second device type. The second device holder, when in the second position, may allow the second device type to be inserted into contact with the second cavity electrical contact. The second device holder, when in the first position, may prevent the second device type to be inserted into contact with the second cavity electrical contact. The first device holder and the second device holder may be configured to rotate in unison. The first device holder and the second device holder may be configured to rotate separately. The first device type may be a transceiver and the second device type may be a battery for the transceiver.

A method of charging a device may comprise configuring a first device holder to receive a first device type and to rotate from a first position to a second position within a first cavity of a charging apparatus while holding the first device type such that the first device type extends to a first height in the first position and a second height in the second position that is lower than the first height. The method may further comprise providing a first device holder electrical contact configured for maintaining contact with the first device and for supplying a charging current to the first device type in the first position, the second position, and throughout rotation from the first position to the second position such that the first holder electrical contact continuously provides current to the first device type so as to charge the first device type. The method may further comprise providing a first slot electrical contact in the first slot configured to supply a charging current to a second device type and configuring the first holder to allow the second device type to be inserted into contact with the first slot electrical contact when the first holder is in the second position and preventing the second device type to be inserted into contact with the first slot electrical contact when the first holder is in the first position. The method may further comprise providing a second device holder configured to receive the first device type and a second holder electrical contact configured for providing current to the first device type wherein the second holder electrical contact is disposed within the second holder. The second holder may be configured to rotate from a first position to a second position within a second slot. The second electrical contact may be configured to maintain contact with the first device type in the first position, the second position, and throughout rotation from the first position to the second position such that the second holder electrical contact continuously provides current to the first device type. In the first position, the first device type may be configured to extend to the first height and in the second position the first device type may be configured to extent to the second height that is lower than the first height. The method may further comprise providing a second slot electrical contact in the second slot configured to supply a charging current to the second device type and configuring the second holder to allow the second device type to be inserted into contact with the second slot electrical contact when the second holder is in the second position and preventing the second device type to be inserted into contact with the second slot electrical contact when the second holder is in the first position. The method may further comprise configuring the first device holder and the second device holder to rotate independently. The first device type may be a transceiver and the second device type may be a battery for the transceiver.

A charging apparatus may comprise a base. The base may comprise at least one cavity configured to receive a first device type. The charging apparatus may comprise an electrical contact disposed within the at least one cavity configured for providing a charging current to the first device type. The device may comprise at least one antenna. The cavity may be configured to provide clearance for the at least one antenna to extend along the length of the base while the first device type is engaged with a wall defining the at least one cavity. The at least one cavity may comprise a depth sufficient to enable a side edge of the first device type to be substantially flush with a top surface of the base when the first device type is engaged with the wall defining the at least one cavity. A front face of the base may be configured to provide clearance for the at least one antenna to extend past the front face of the base. The front face may be provided with an opening to allow the at least one antenna to extend past the front face of the base.

In the foregoing specification, the present disclosure has been described with reference to specific exemplary embodiments thereof. Although the disclosure has been described in terms of a preferred embodiment, those skilled in the art will recognize that various modifications, embodiments or variations of the disclosure can be practiced within the spirit and scope of the disclosure as set forth in the appended claims. The specification and drawings are, therefore, to be regarded in an illustrated rather than restrictive sense. Accordingly, it is not intended that the disclosure be limited except as may be necessary in view of the appended claims.

The invention claimed is:

1. A charging apparatus comprising:
   a base comprising at least one cavity; and
   at least one device holder disposed within the at least one cavity and pivotably fixed to the base; and
   wherein the at least one device holder is configured to receive, maintain, and continuously charge a first device type when the at least one device holder is in a plurality of positions, the at least one device holder further comprising a first electrical contact disposed within the at least one device holder configured to provide a charging current to the first device type.

2. The charging apparatus of claim 1, wherein the at least one device holder comprises an engaging face, wherein the engaging face is parallel to an upper surface of the base and substantially flush with the upper surface of the base in a first position and the engaging face is perpendicular to the upper surface of the base in a second position.

3. The charging apparatus of claim 1, wherein the at least one cavity further comprises at least one cavity electrical contact adjacent to the at least one device holder and is configured to engage and charge a second device type.

4. The charging apparatus of claim 3, wherein the at least one device holder has a length that precludes the at least one cavity electrical contact from engaging and charging the second device type when the at least one device holder is in a first position.

5. The charging apparatus of claim 1, wherein the base further comprises a first side and a second side, the first and second sides each comprising a plurality of connection terminals for mechanical and communicative attachment to a plurality of bases.

6. The charging apparatus of claim 1, further comprising a second cavity adjacent and parallel to the at least one cavity, the second cavity comprising:

a second device holder disposed within the second cavity, pivotably fixed to the base, independently pivotable from the at least one device holder, and configured to receive, maintain, and charge the first device type when the second device holder is in a plurality of positions, the second device holder further comprising:

an engaging face; and a second electrical contact disposed within the second device holder configured to provide a charging current to the first device type; and a second cavity electrical contact adjacent to the second device holder and configured to receive and charge a second device type.

7. The charging apparatus of claim 2, wherein the at least one device holder comprises a height when in the second position that is compatible with use in a 3-rack unit drawer.

8. The charging apparatus of claim 3, wherein the first device type is a transceiver and the second device type is a battery for the transceiver.

9. A charging apparatus comprising:

a first device holder configured to receive a first device type and comprising a first electrical contact configured for providing a charging current to the first device type;

wherein the first device holder is configured to rotate from a first position to a second position within a first cavity of the charging apparatus while holding the first device type;

wherein the first electrical contact is configured to maintain contact with the first device type in the first position, the second position, and throughout rotation from the first position to the second position such that the first electrical contact continuously provides current to the first device type so as to charge a battery of the first device type; and wherein in the first position the first device type extends to a first height and in the second position the first device type extends to a second height that is lower than the first height.

10. The charging apparatus of claim 9, wherein the first cavity further comprises a first cavity electrical contact configured to provide a charging current to a second device type, and wherein the first device holder when in the second position allows the second device type to be inserted into contact with the first cavity electrical contact and the first device holder when in the first position prevents the second device type from being inserted into contact with the first cavity electrical contact.

11. The charging apparatus of claim 9, further comprising a second device holder configured to receive the first device type, the second device holder comprising a second electrical contact configured for providing current to the first device type, wherein the second electrical contact is disposed within the second device holder; wherein the second device holder is configured to rotate from a first position to a second position within a second cavity; wherein the second electrical contact is configured to maintain contact with the first device type in the first position, the second position, and throughout rotation from the first position to the second position such that the second electrical contact continuously provides current to the first device type; and wherein in the first position the first device type extends to the first height and in the second position the first device type extends to the second height that is lower than the first height.

12. The charging apparatus of claim 11, wherein the second cavity further comprises a second cavity electrical contact configured to provide a charging current to a second device type, and wherein the second device holder when in the second position allows the second device type to be inserted into contact with the second cavity electrical contact and the second device holder when in the first position prevents the second device type from being inserted into contact with the second cavity electrical contact.

13. The charging apparatus of claim 11, wherein the first device holder and the second device holder are configured to rotate in unison.

14. The charging apparatus of claim 11, wherein the first device holder and the second device holder are configured to rotate independently.

15. The charging apparatus of claim 12, wherein the first device type is a transceiver and the second device type is a battery for the transceiver.

16. A charging apparatus comprising:

a base comprising at least one cavity, opening on a top surface and opening on at least one side surface, that is configured to receive a first device type; and an electrical contact disposed within the at least one cavity configured for providing a charging current to the first device type;

wherein the first device type comprises at least one antenna; and wherein the at least one cavity is configured to provide clearance for the at least one antenna to extend outside of the at least one side surface along at least a portion of a length of the base while the first device type is engaged with a wall defining the at least one cavity.

17. The charging apparatus of claim 16, wherein the at least one cavity comprises a depth sufficient to enable a side edge of the first device type to be substantially flush with a top surface of the base when the first device type is engaged with the wall defining the at least one cavity.

18. The charging apparatus of claim 16, wherein a front face of the base is configured to provide clearance for the at least one antenna to extend past the front face of the base.

19. The charging apparatus of claim 18, wherein the front face is provided with an opening to allow the at least one antenna to extend past the front face of the base.

20. The charging apparatus of claim 16, wherein the first device type is a bodypack transmitter.

* * * * *